(12) United States Patent
Meadows et al.

(10) Patent No.: US 12,541,808 B1
(45) Date of Patent: Feb. 3, 2026

(54) IDENTIFYING ITEM ORIGIN BY MATCHING IMAGE EMBEDDINGS

(71) Applicant: Amazon Technologies, Inc., Seattle, WA (US)

(72) Inventors: Michael A Meadows, Oakton, VA (US); Amandeep Singh, Clarksburg, MD (US); Sahaj Amatya, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 18/373,546

(22) Filed: Sep. 27, 2023

(51) Int. Cl.
*G06T 1/00* (2006.01)
*G06V 10/74* (2022.01)
*G06V 20/70* (2022.01)

(52) U.S. Cl.
CPC .......... *G06T 1/0021* (2013.01); *G06V 10/761* (2022.01); *G06V 20/70* (2022.01)

(58) Field of Classification Search
CPC ..... G06T 1/0021; G06V 10/761; G06V 20/70
See application file for complete search history.

(56) References Cited

U.S. PATENT DOCUMENTS

2007/0271463 A1* 11/2007 Ginter .............. H04N 21/25875
713/176

* cited by examiner

*Primary Examiner* — Christopher Wait
(74) *Attorney, Agent, or Firm* — Kilpatrick Townsend & Stockton LLP

(57) ABSTRACT

Techniques for item origin identification by matching image embeddings are described herein. For example, a computer system can access first image data corresponding to a set of items at a first location of a facility. The first image data can be associated with the first location and can be obtained by a first imaging device. The computer system can generate first set of image embeddings based on the first image data. The first set of image embeddings can represent the set of items. The computer system can determine that a first item of the set of items originated at the first location based at least in part on a matching algorithm comparing the first set of image embeddings with a second image embedding that represents the first item at an identification location of the facility.

20 Claims, 12 Drawing Sheets

| PRE-IDENTIFICATION QUEUE 502 |||
|---|---|---|
| Q1 | Q2 | Q3 |
| 2 | | |
| | 1 | |
| | 3 | |
| 6 | | |
| | | 5 |
| 9 | | |
| | 4 | |
| | | 7 |
| | | 10 |
| | 8 | |
| | | 14 |

FIG. 5

IDENTIFYING ITEM ORIGIN BY MATCHING IMAGE EMBEDDINGS

BACKGROUND

Modern inventory systems, such as those in mail order warehouses, supply chain distribution centers, airport luggage systems, and custom-order manufacturing facilities, face significant challenges in managing inventory items. Items may be delivered in batches to a facility and may then be transferred to different locations in the facility. Items from different batches may merge as they are moved about the facility, causing difficulties in identifying item origin.

BRIEF DESCRIPTION OF THE DRAWINGS

Various embodiments in accordance with the present disclosure will be described with reference to the drawings, in which:

FIG. 5 illustrates an example table of a pre-identification queue of items, according to some embodiments;

DETAILED DESCRIPTION

Figure 1:
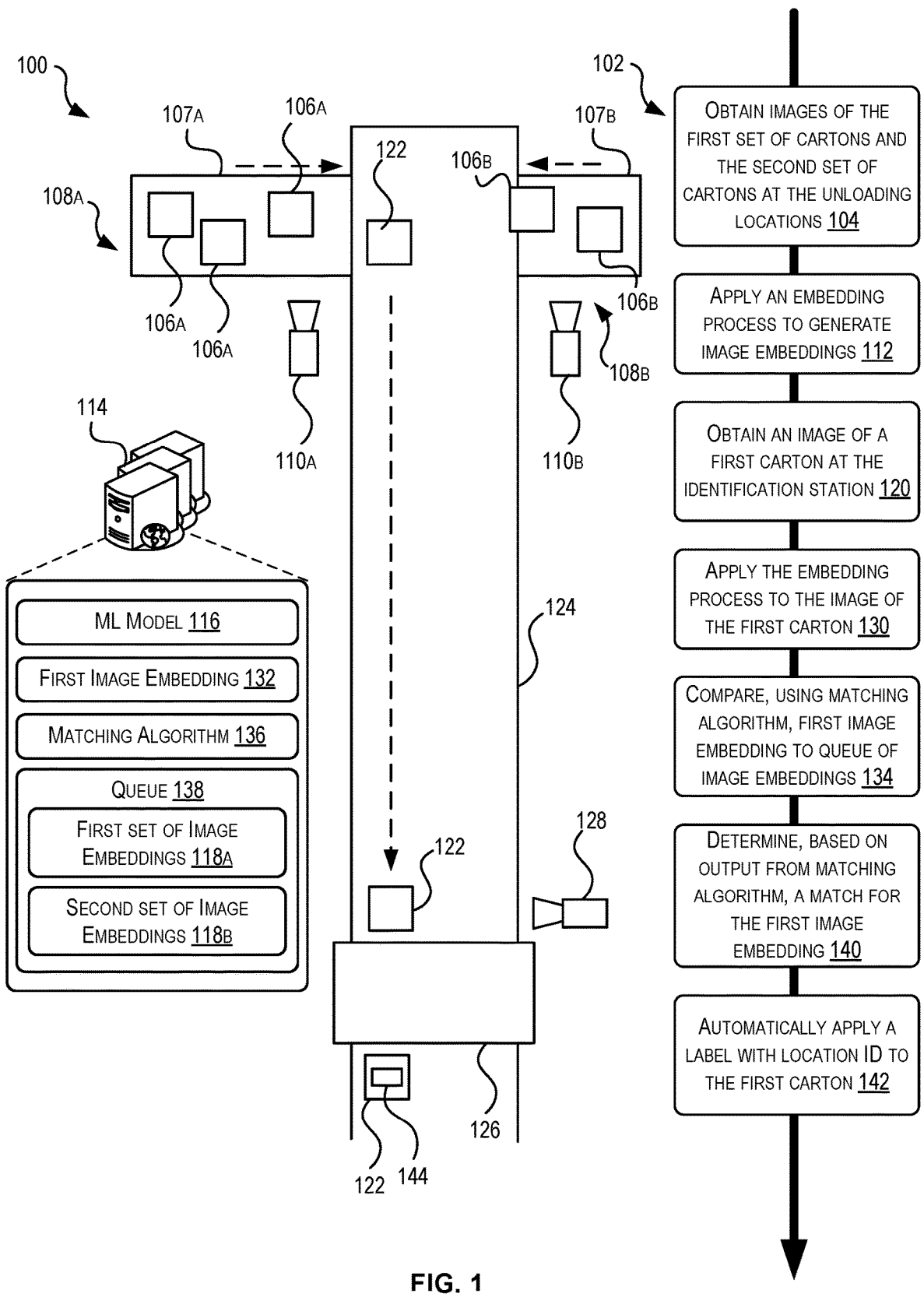
FIG. 1 illustrates a block diagram and a flowchart showing an example process for identifying item origin by matching image embeddings, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present disclosure are directed to, among other things, methods, systems, devices, and computer-readable storage media relating to identifying item origin by matching image embeddings. For example, groups of cartons may be delivered to various locations of a facility. Many of the cartons may be a same type of container and/or have a similar appearance. Cartons from different deliveries can be unloaded onto conveyer systems that can move the cartons to different locations in the facility. It may be important to track the origin of an individual carton that has moved to a different location in the facility, particularly as different groups of cartons merge together on conveyer systems. But, doing so may be time consuming and labor intensive as it may include a user manually labeling and/or scanning each individual carton that is unloaded in at a particular location. Instead, as carton is unloaded, an image of the carton can be captured. The image can be associated with the unloading location. Such carton images can be processed with a machine learning model to generate image embeddings that link to location identifiers for unloading locations. At a later time when the carton is at an identification location of the facility, another image of the carton can be captured and an image embedding may be generated based on the image. This new image embedding can be compared to image embeddings from unloading locations using a matching algorithm. The matching algorithm can determine an image embedding that best matches the new image embedding, which can be used to identify origin of the carton. Thus, carton origin can be determined based on image embeddings corresponding to a carton itself, rather than using physical labels applied when the carton is unloaded.

Turning now to a particular example, an inventory warehouse may have multiple docks at which trailers from vendors can deliver inventory such as cartons or pallets of stacked cartons. The cartons may be similar in appearance (e.g., a same type of carton, made from the same material, the same or similar dimensions, etc.). A trailer can deliver cartons at a dock that has a dock identifier. As cartons are unloaded from the trailer and onto a conveyer system, a first camera can obtain an image of each carton at the dock. A trained machine learning model can generate image embeddings of the images of cartons at the dock. Image embeddings are lower-dimension semantic representations of the cartons (e.g., floating point vectors). The image embeddings can link to the dock identifier for the dock at which the cartons were unloaded. For example, an image embedding vector can include the characters of the dock identifier. This process can also be performed for other cartons unloaded at other docks with different dock identifiers in the warehouse.

After being unloaded onto the conveyer system, the cartons from various docks may be merged into a single conveyer lane to move throughout the warehouse. As the cartons may not have labels indicating their dock origin, it may be difficult or impossible for a human to visually identify the origin of an individual carton after merging due to the similarity in appearance between cartons. The merged cartons may be moved by the conveyer system to an identification station, at which a second camera can obtain an image of a first carton on the conveyer system. This new image can also be inputted into the trained machine learning model to generate a first image embedding. A matching algorithm can then be used to determine best matches between the first image embedding and a queue of image embeddings. The queue can include image embeddings (which include linked dock identifiers) of cartons unloaded at various docks in the warehouse. In some examples, the queue may be constrained to the first few (e.g., three) image embeddings of cartons unloaded from various docks. This is because the order of cartons unloaded from the docks are known, and the first carton that is being identified at the identification station will be one of the first few cartons unloaded from a certain dock. This constraining can allow the matching algorithm to quickly and accurately determine a best match from the queue.

For example, the matching algorithm may be used to determine cosine similarity between the first image embedding and the image embeddings in the queue. The image embedding in the queue with the highest cosine similarity to the first image embedding can be selected as a match for the first carton. The matched image embedding links to the dock identifier, thus establishing the origin of the first carton. In this example, the first carton may be identified as originating from a first dock. A device at the identification station can then automatically apply a label displaying the dock identifier for the first dock onto the first carton. This label will be used to identify the origin of the first carton as it continues to move throughout the warehouse.

Once the origin of the first carton has been determined, the queue of image embeddings can be updated. If the queue originally included image embeddings of three cartons from the first dock, the matched image embedding may be removed, and the image embedding representing the fourth carton unloaded from the first dock can be added to the queue. This updated queue is used by the matching algorithm to determine cosine similarities with the next carton that reaches the identification station. Thus, subsequent matches are dependent on previous matches.

An incorrect image embedding match can therefore have cascading effects. To improve match accuracy, backtracking of the matching algorithm for multiple matches can be performed to determine if a different initial match may produce more accurate matches overall. For example, a first carton may be matched with an image embedding associated with the first dock. Two more cartons may be matched after the first carton match. But the matching algorithm may produce relatively low cosine similarity values between the image embedding for the third item and each of the image embeddings in the queue. For example, the highest cosine similarity value produced by the matching algorithm for the third carton may be below a threshold amount, such as 0.5. A backtracking process can therefore be performed for the three most recent matches by reselecting a match for the first carton. For example, the first carton may be reselected to match with an image embedding in the queue with a second highest cosine similarity value, which may be associated with a second dock. The matching algorithm can be used to determine matches for the second carton and third carton with a differently updated queue (e.g., the image embedding from the second dock may be removed from the queue, rather than the image embedding from the first dock). If the backtracking process produces cosine similarity values that are, on average, higher than the original average cosine similarity values, the origin of the three cartons may be reassigned according to the backtracking process. In some examples, the backtracking process may be performed for each other potential match for cartons in the backtrack queue, not just with the image embedding having the second highest cosine similarity value. The backtracking process can be performed after a set number of matches have been determined, in response to producing low cosine similarity values, or in any other situation in which backtracking may improve cosine similarity. In some examples, backtracking can be performed after each match is determined.

Examples of the present disclosure provide various technological advantages over conventional systems and methods for identifying item origin in facilities. For instance, conventional approaches involve a warehouse worker applying a label with an origin identifier to each carton during unloading. This additional step of printing and applying a label requires additional manpower and can slow the unloading process. As a large amount (e.g., a billion) of items may be unloaded for an organization in a year, reducing unloading time for individual items by even a small amount can lead to considerable improvements in efficiency. Other conventional approaches that identify origins of image embeddings using machine learning processes may be significantly less accurate than origin identification determined via matching algorithms, particularly when backtracking is additionally performed for the matching algorithm. In some examples, embodiments described herein can establish origin of items with an accuracy at or above 98.5%.

Embodiments described herein can also conserve computing resources compared to conventional techniques. For example, the search space for the matching algorithm can be constrained to a relatively small set. The fact that items are generally processed in a first in first out sequence from unloading can help guide search results. After unloading a group of cartons, the queue may initially only include image embeddings for the first few cartons. Additionally, the time to go from an unloading origin to the identification location can be known, so the queue need not include image embeddings for cartons that were unloaded only moments ago. Thus, the total possible set of embeddings that the matching algorithm searches against may be small (e.g., less than 1000 items). This small set can be exhaustively searched and can be held in memory. Using a matching algorithm for a small queue may be less computationally expensive than identifying matches via a machine learning model. Further, it may not be necessary to match an exact image embedding, as the goal is to identify an origin of an item. This can mean that if all likely embedding matches (e.g., all matches with cosine similarity values above a certain threshold) share an origin, the matching algorithm can assign that origin even if the identity of the carton is uncertain.

Turning now to the figures, FIG. 1 is an example block diagram of a system 100 and associated flowchart showing a process 102 for implementing techniques relating to identifying item origin by matching image embeddings, according to some embodiments. The system 100 includes devices, objects, and the like that correspond to the process 102. The process 102 can be performed by computing system 114.

Figure 10:
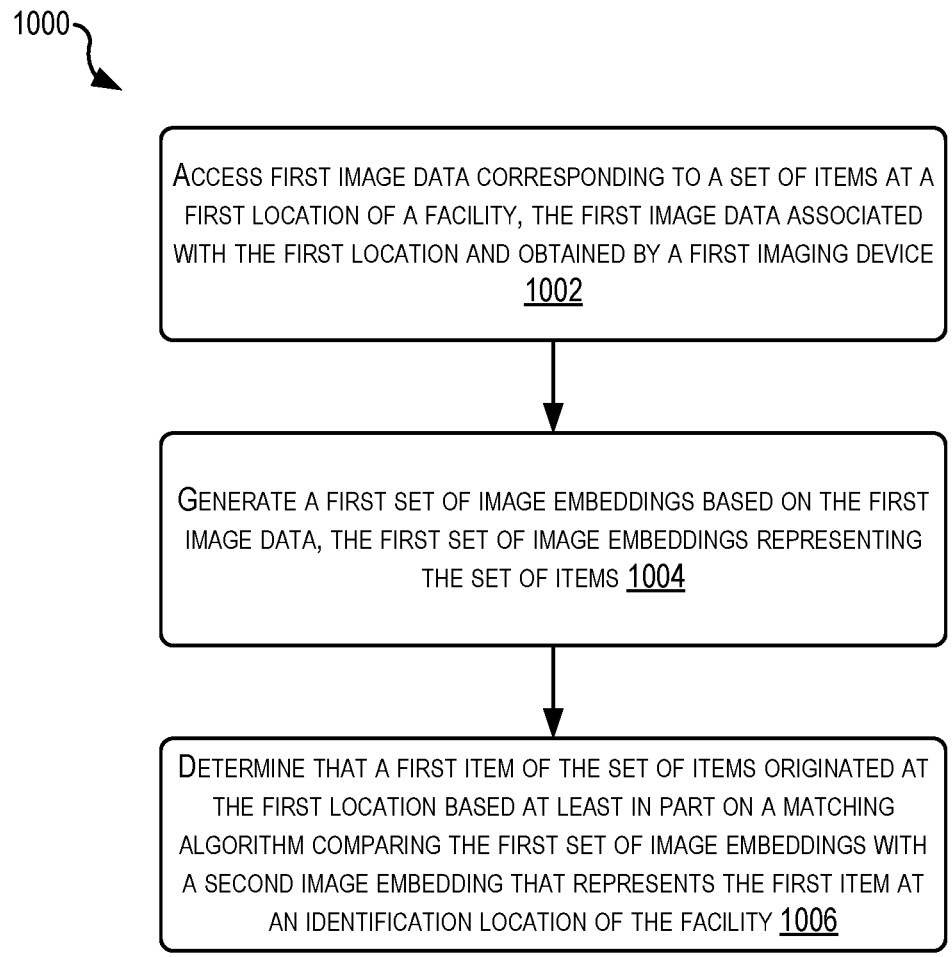
FIG. 10 illustrates a flowchart showing an example process for identifying item origin by matching image embeddings, according to some embodiments.
Figure 11:
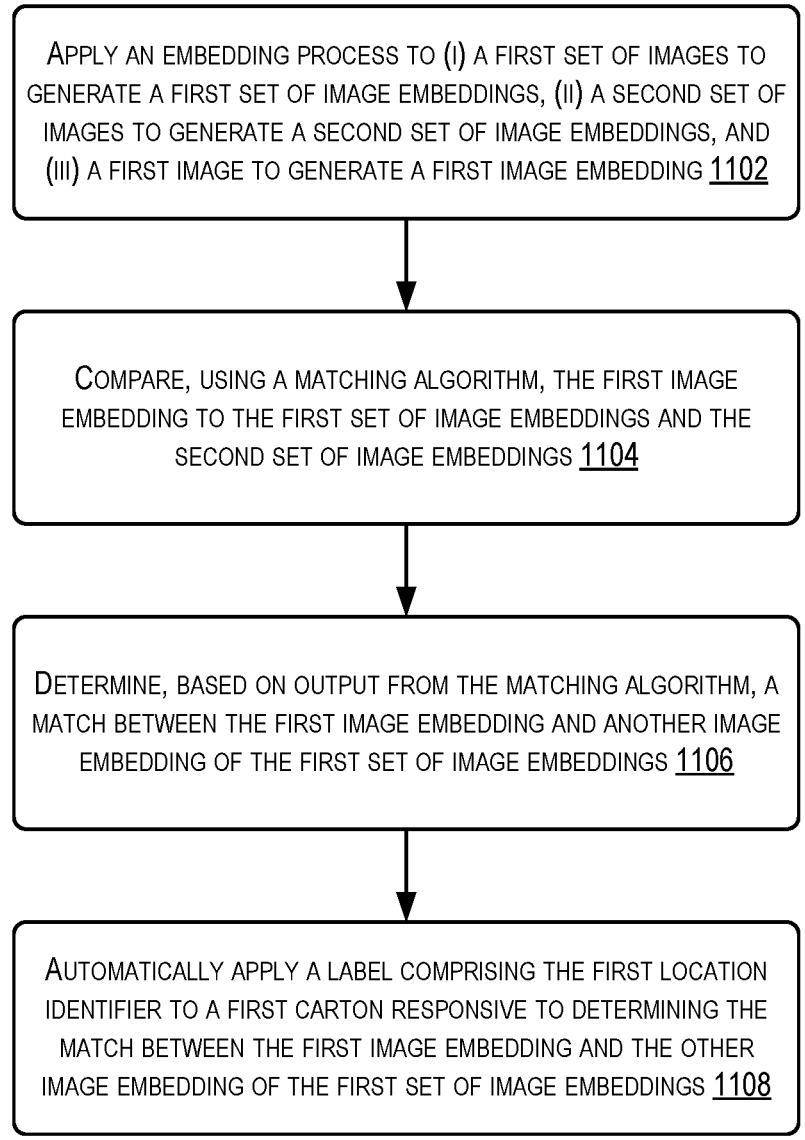
FIG. 11 illustrates a flowchart showing another example process for identifying item origin by matching image embeddings, according to some embodiments.

FIGS. 1, 10, and 11 illustrate example flow diagrams showing respective processes 102, 1000, and 1100 as described herein. The processes 102, 1000, and 1100 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 102, 1000, or 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 104 by obtaining images of cartons 106a-b being unloaded at unloading stations 108a-b of a facility. Specifically, a first set of cartons 106a can be unloaded onto a side conveyer system 107a at a first unloading station 108a. A second set of cartons 106b can be unloaded onto a side conveyer system 107b at a second unloading station 108b. The side conveyer systems 107a-b can merge the cartons 106a-b onto a main conveyer system 124. A first camera 110a can obtain an image of each carton 106a in the first set as it is unloaded onto the side conveyer system 107a. This produces a first set of images that are transmitted to a computing system 114, along with a first identifier for the first unloading station 108a. Similarly, a second camera 110b can obtain an image of each carton 106b in the second set as it is unloaded onto the side conveyer system 107b. This produces a second set of images that are transmitted to the computing system 114, along with a second identifier for the second unloading station 108b.

At block 112, the computing system 114 can apply an embedding process to the first set of images and the second set of images to generate a first set of image embeddings 118a and a second set of image embeddings 119b, respectively. For example, the sets of images can be inputted into a machine learning model 116 that is trained to generate image embeddings. In one example, the images may be 800×800 pixel grayscale images that are inputted into the machine learning model 116, which can output a 200-length floating point vector as an image embedding. The vector may include the first identifier for the first unloading station 108a. The second set of image embeddings 118b may include the second identifier for the second unloading station 108b. In some examples, before the embedding process is applied, the images can be cropped to remove features besides the carton. Additionally, the resolution of the image may be lowered.

Pre-processing the images in this way can improve accuracy of item origin identification.

In an example, the machine learning model 116 can be trained on about 4000 pairs of images depicting items (e.g., cartons). To increase the size of this relatively small dataset, 50 pairs of images from the dataset can be selected at a time. One image from each pair can be augmented with zoom changes, color jitter, and rotation. The augmented image pairs can be processed to produce image embeddings used in an N-pairs loss function to guide the machine learning model 116 to learn to compute similar image embeddings. After the initial training, the machine learning model 116 can be used to compute the nearest neighbor matches for each image. This can be used to repeat the training process for some additional time. The effect is that in the second round of training, all sets of the 50 pairs of images look substantially similar according to the machine learning model 116.

At block 120, an image of a first carton 122 (e.g., a first image) at an identification station 126 is obtained. The identification station 126 is positioned on the main conveyer system 124 downstream from the unloading stations 108a-b. Cartons from various unloading stations 108a-b can merge onto the main conveyer system 124 as they approach the identification station 126. The origin of the first carton 122 may therefore be unknown. The image of the first carton 122 can be obtained by a third camera 128 positioned at the identification station 126. The first image can be transmitted to the computing system 114. At block 130, the computing system 114 can apply the embedding process to the image of the first carton 122 to generate a first image embedding 132. For example, the computing system 114 can input the first image into the machine learning model 116, which can output the first image embedding 132. The first image embedding 132 may not have a location identifier because the origin of the first carton 122 is unknown.

At block 134, the computing system 114 can compare, using a matching algorithm 136, the first image embedding 132 to a queue 138 of image embeddings. The queue 138 can include some or all of the sets of image embeddings 118a-b. For example, because the first carton 122 is the first to arrive at the identification station 126, it is likely that the first carton 122 was one of the initial cartons photographed by the first camera 110a or second camera 110b. Thus, the queue 138 may only include image embeddings associated with the first five cartons in the first set of image embeddings 118a and the second set of image embeddings 118b. Other numbers of image embeddings from each set may be included. Additionally or alternatively, the image embeddings may be included in the queue 138 based on time since the associated images were captured by the cameras 110a-b. For example, a carton 106a unloaded at the first unloading station 108a may, on average, take five minutes to reach the identification station 126. Thus, the queue 138 may only include image embeddings from the first set of image embeddings 118a associated with images captured more than five minutes ago.

The matching algorithm 136 can begin the comparison by assuming that it is provided some "oracle" that can usually distinguish between image pairs. The matching algorithm 136 does not require that the oracle is always right, but the more correct the oracle is, the better. As the oracle improves, so does the accuracy of the matching algorithm 136. The matching algorithm 136 may determine a cosine similarity between the first image embedding 132 and image embeddings in the queue 138. Each of the cartons 106a-b unloaded at the facility may be similar in type, material, dimension, etc. It may be difficult or impossible for a human to distinguish between cartons to determine origin. Although the cartons 106a-b may look nearly identical to the human eye, tape crinkles, divots or punctures in a carton, crumpled corners, or other such features can be used by the matching algorithm 136 to determine cosine similarity values between image embeddings.

At block 140, the computing system 114 can determine, based on output from the matching algorithm 136, a match for the first image embedding 132. For example, the computing system 114 can determine the match by identifying the image embedding in the queue 138 that has the highest cosine similarity value with the first image embedding 132. The matched image embedding in the queue 138 includes a location identifier for the origin of its associated item, such as the identifier for the first unloading station 108a. Thus, the computing system 114 can assign an origin of the first unloading station 108a to the first carton 122.

At block 142, the identification station 126 can automatically apply a label 144 with the location identifier for the first unloading station 108a to the first carton 122. This label 144 can be used to identify the origin of the first carton 122 as it continues transportation through the facility. For example, the label 144 may include a barcode that can be associated with the location identifier for the first unloading station 108a. The association may be stored by the computing device 114 in a lookup table. The process of identifying the origin of the first carton 122 and applying the label 144 after the first carton 122 arrives at the identification station 126 can be performed relatively quickly (e.g., within a few seconds).

Figure 2:
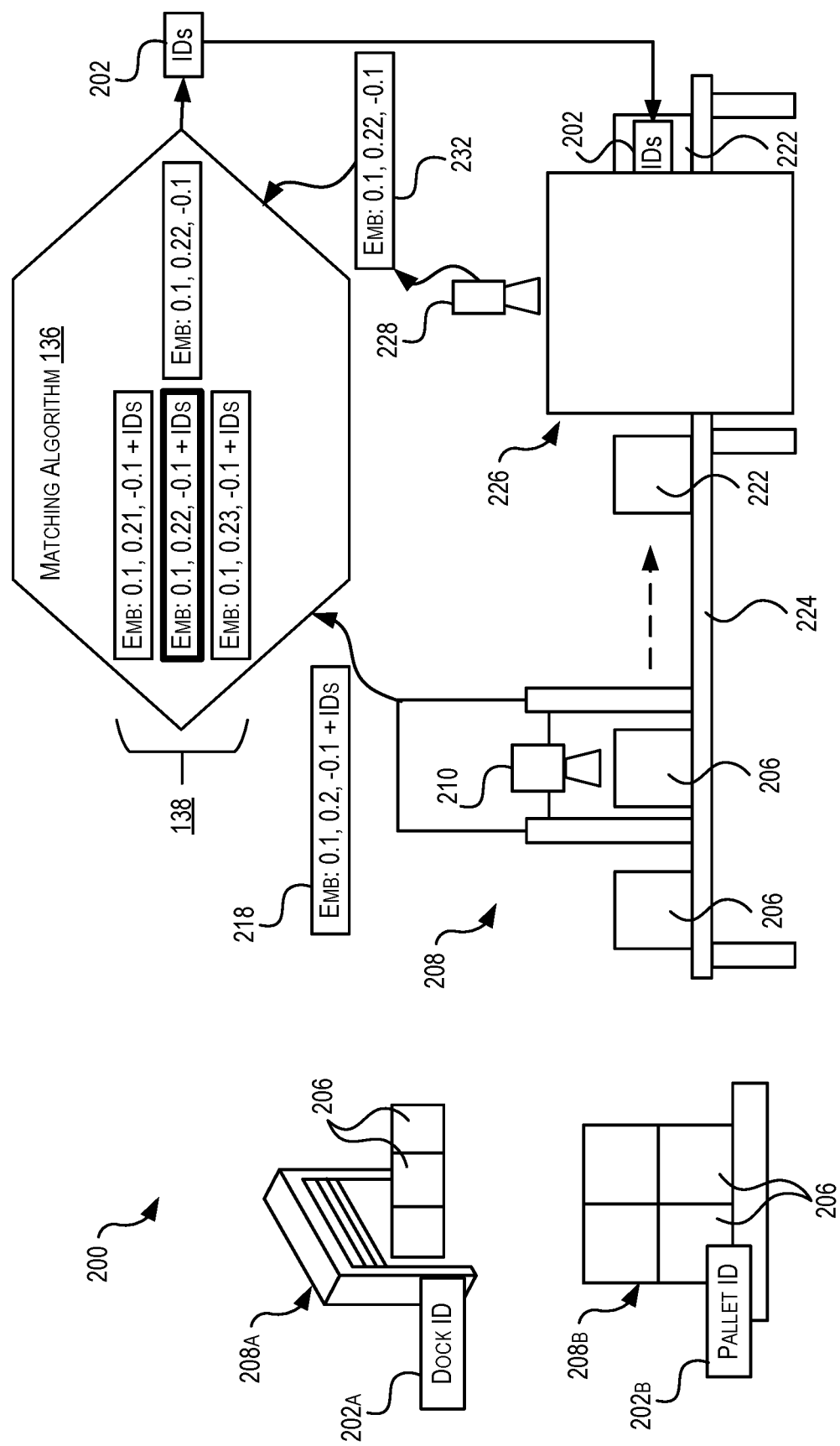
FIG. 2 illustrates an example facility at which item origin is identified by matching image embeddings, according to some embodiments.

FIG. 2 illustrates an example facility 200 at which item origin is identified by matching image embeddings, according to some embodiments. Items 206 (e.g., cartons, boxes, or other inventory items) can be unloaded at a first location 208 in the facility 200. In some examples, the first location 208 may be a docking station 208a at which a trailer can dock to unload items 206. The docking station 208a can have a dock identifier 202a. When the items 206 are delivered at the docking station 208a, a facility worker may scan the dock identifier 202a before unloading items 206 onto a conveyor system 224. Images of the unloaded items 206 on the conveyor system 224 are then obtained by an imaging device 210. In some examples, the imaging device 210 may automatically scan the dock identifier 202a before obtaining images of the items 206. The dock identifier 202a can be linked to each of the images of items from the docking station 208a. An embedding process can be applied (e.g., by a machine learning model) to the images to produce a first set of image embeddings 218, which can include the dock identifier 202a. The first set of image embeddings 218 for items 206 from the first location 208 can be transmitted to a computing device executing a matching algorithm 136.

When a first item 222 (which may have originated at the first location 208, or at another location) reaches an identification location 226 on the conveyor system 224, a second imaging device 228 can obtain an image of the first item 222. Similar to the first set of image embeddings 218, the embedding process can be applied to the image to generate a first image embedding 232. But the first image embedding 232 may not include a location identifier 202 as the origin of the first item 222 is unknown. The first image embedding 232 can be transmitted to the computing device executing the matching algorithm 136.

To determine the origin of the first item 222, the matching algorithm 136 may generate a queue 138 of image embeddings. The queue 138 may include a subset of the first set of image embeddings 218, as well as subsets of additional sets of image embeddings. The additional image embeddings may be associated with other locations at which items 206 were unloaded onto the conveyor system 224. The matching algorithm 136 can compare the first image embedding 232 to image embeddings in the queue 138 and can produce a best match with an image embedding from the first set of image embeddings 218. This can indicate that the first item 222 is likely represented by the matched image embedding, which includes a location identifier 202 for the first location 208. Thus, the first item 222 is likely to have originated from the first location 208. A device at the identification location can then automatically apply a label (e.g., a sticker) to the first item 222 that displays the location identifier 202 for the first location 208. Alternatively, the label may display another identifier such as a barcode that may be associated with the location identifier 202.

In some examples, the first location 208 may be a pallet station 208b at the conveyer system 224. For example, trailers may deliver pallets of items 206 to the docking station 208a, which can then be transported to a pallet station 208b. Each pallet may have a pallet identifier 202b. The facility worker can scan (or an imaging device can automatically obtain) the dock identifier 202a and then the pallet identifier 202b to link the pallet to its docking station 208a. The subsequent image embeddings can include the pallet identifier 202b. Thus, when the matching algorithm 136 identifies an image embedding matched to the first image embedding 218, the first item 222 is identified as originating from the pallet station 208b based on the pallet identifier 202b for the matched image embedding. The link between the pallet identifier 202b and the dock identifier 202a is then used to determine the origin of the first item 222.

Figure 3:
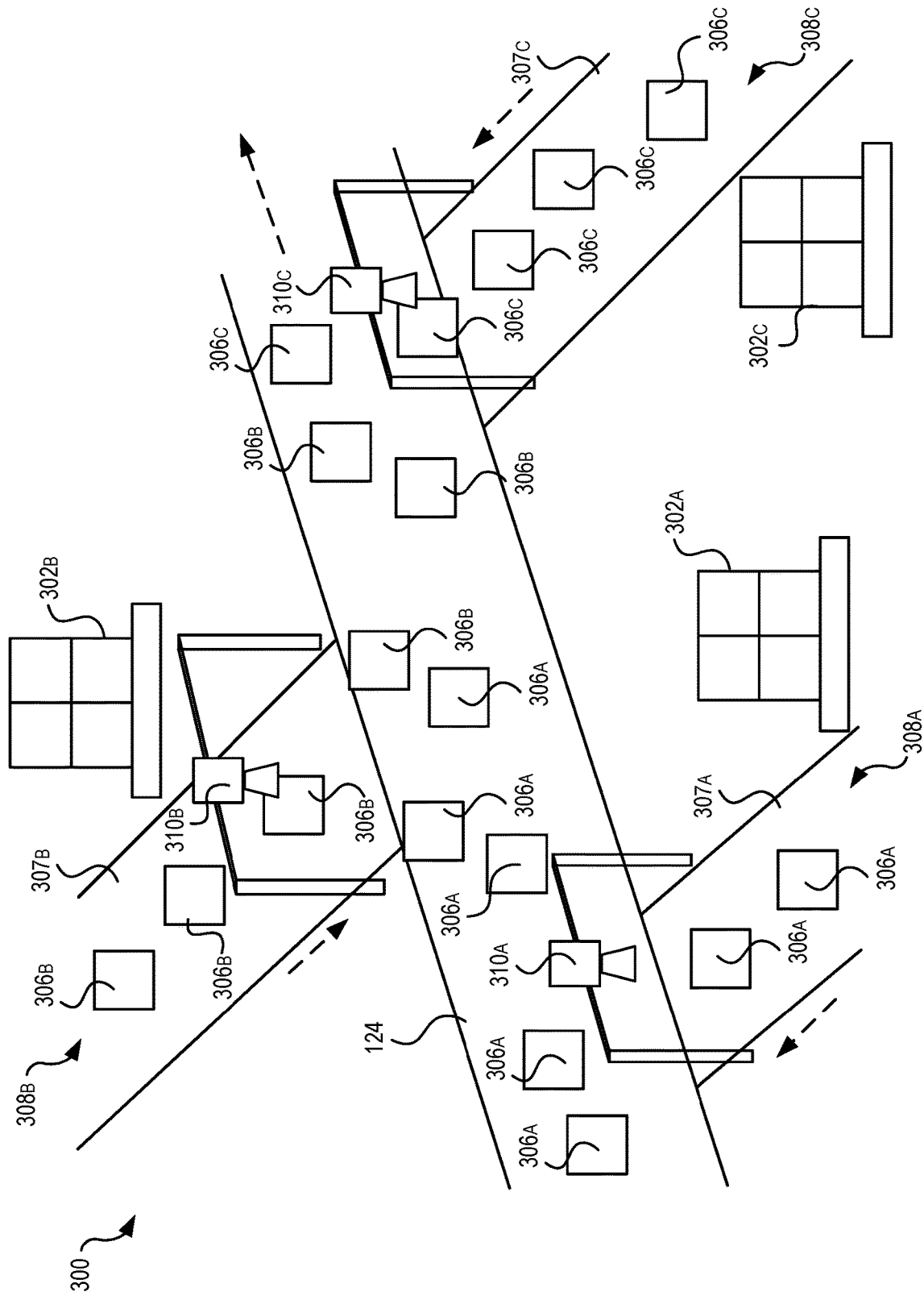
FIG. 3 illustrates a perpendicular tree conveyer system in a facility at which item origin is identified by matching image embeddings, according to some embodiments.

FIG. 3 illustrates a perpendicular tree conveyer system 300 in a facility at which item origin is identified by matching image embeddings, according to some embodiments. The perpendicular tree conveyer system 300 includes a main conveyer system 124 and conveyer systems 307a-c that feed items 306a-c onto the main conveyer system 124. Each conveyer system 307 is part of an unloading station 308 for pallets 302. Items 306a-c can be unloaded onto the conveyer systems 307a-c as the pallets 302a-c are broken down. The unloading stations 308a-c additionally include imaging devices 310a-c that obtain images of items 306a-c as the items 306a-c are conveyed from the conveyer systems 307a-c to the main conveyer system 124. The items 306a-c from the various unloading stations 308a-c merge together on the main conveyer system 124. The merged items 306a-c can be transported by the main conveyer system 124 to an identification station, as described above in FIGS. 1-2.

The additional conveyer systems 307a-c may allow multiple pallets 302a-c to be broken down and unloaded at the same time. An example length of a conveyer system 307 can be from 8 to 10 feet. In some examples, the conveyer systems 307 can be installed at a slant, such as a 60° angle with respect to the main conveyer system 124. There can be a clear link between items 306 from a particular pallet 302 because each item from the particular pallet is captured by an imaging device 310 for the unloading station 308.

Figure 4:
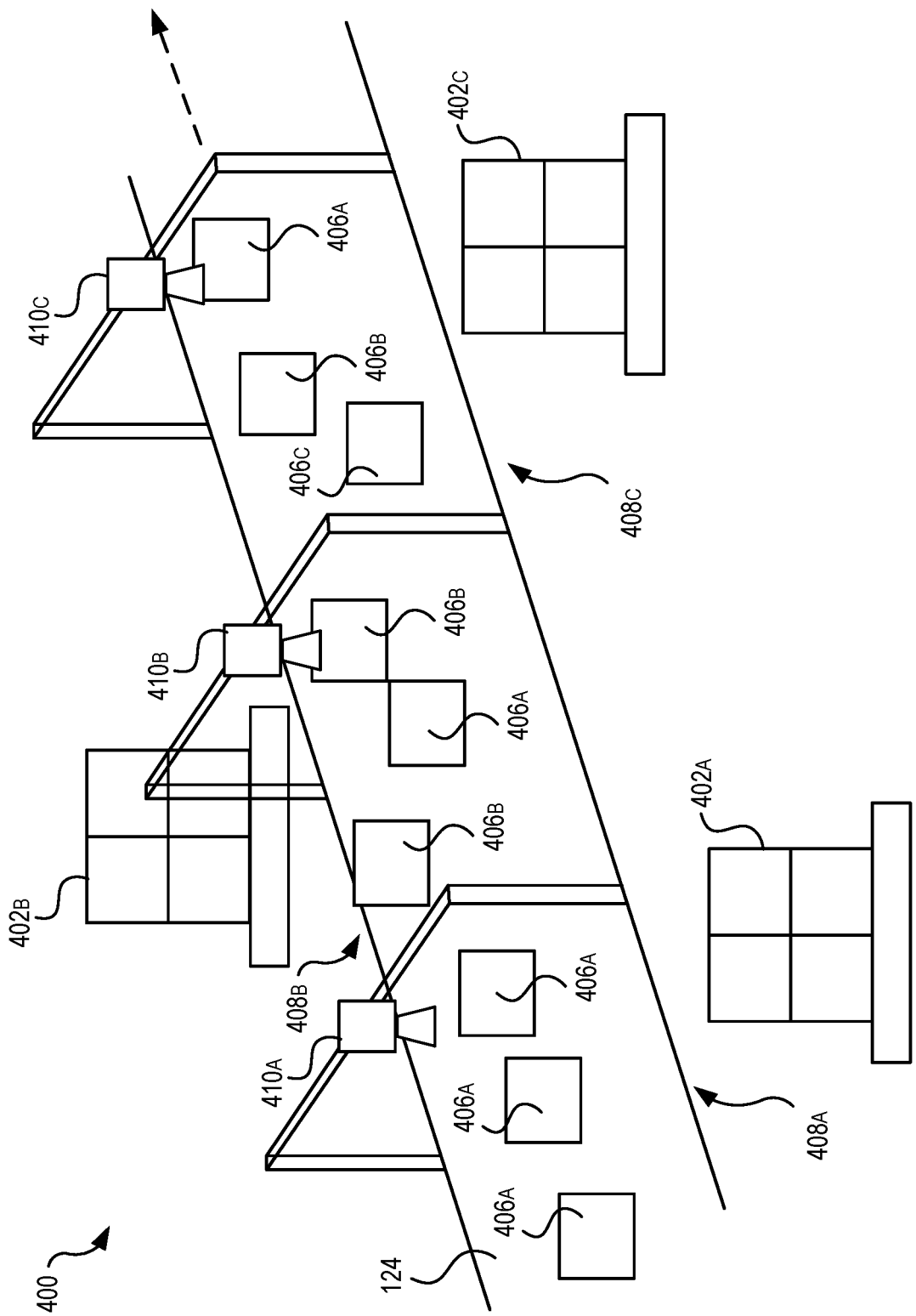
FIG. 4 illustrates a single line conveyer system in a facility in which item origin is identified by matching image embeddings, according to some embodiments.

FIG. 4 illustrates a single line conveyer system 400 in a facility in which item origin is identified by matching image embeddings, according to some embodiments. In the single line conveyer system 400, items 406 from pallets 402 are unloaded directly onto a main conveyer system 124, rather than onto separate conveyer systems that feed into a main conveyer system. Thus, unloading stations 408a-c are located at various points along the main conveyer system 124. Each unloading station 408a-c includes an imaging device 410a-c oriented towards the main conveyer system 124 that can obtain images of items 406a-c unloaded from the pallets 402a-c. The Items 406a-c from various unloading stations 408a-c can merge together onto the main conveyer system 124. The merged items 306a-c can be transported by the main conveyer system 124 to an identification station, as described above in FIGS. 1-2. Because the imaging devices 410a-c are obtaining images of the main conveyer system 124, some items 406a-c may be photographed by multiple imaging devices 410a-c.

For example, a first pallet 402a can be broken down at the first unloading station 408a. Items 406a can be unloaded from the first pallet 402a onto the main conveyer system 124. The first imaging device can obtain images of the items 406a. As the items 406a are conveyed by the main conveyer system 124, the items 406a may pass beneath the second imaging device 410b and the third imaging device 410c, which may each acquire images of the items 406a. But not all items are photographed by all three imaging devices 410a-c. The second unloading station 408b can be positioned downstream from the first unloading station 408a, and thus items 406b from the second pallet 402b are photographed by only the second imaging device 410b and the third imaging device 410c. Similarly, the third unloading station 408c is downstream from the first unloading station 408a and the second unloading station 408b. Items 406c from the third pallet 402c are photographed by only the third imaging device 410c.

The number of times that images are obtained of items 406a-c can be used in determining the origin of items 406a-c. For example, an item 406a may be identified in an image captured by each of the imaging devices 410a-c to be assigned an origin of the first pallet 402a. An item 406c depicted in only one image may be unlikely to be assigned an origin of the first pallet 402a. Having each pallet 402a-c be unloaded directly onto the main conveyer system 124 can therefore introduce additional complexity to item origin identification. But the imaging devices 410a-c can be installed on top of an existing conveyer system, which can be less intrusive to an existing layout compared to the perpendicular tree conveyer system 300 of FIG. 3.

FIG. 5 illustrates an example table of a pre-identification queue 502 of items received by an identification station prior to origin identification, according to some embodiments. The pre-identification queue 502 includes items from a first unloading station Q1, items from a second unloading station Q2, and items from a third unloading station Q3. Each number in the pre-identification queue 502 represents an item. The items merged together onto a conveyer system in the order depicted by the pre-identification queue 502. That is, the first item received by the identification station is item 2 from Q1, then item 1 from Q2, then item 3 from Q2, and so forth. The items from a particular unloading station will maintain their own first-in first-out order. For example, item 2, then item 6, then item 9 was unloaded at Q1.

Figure 6:
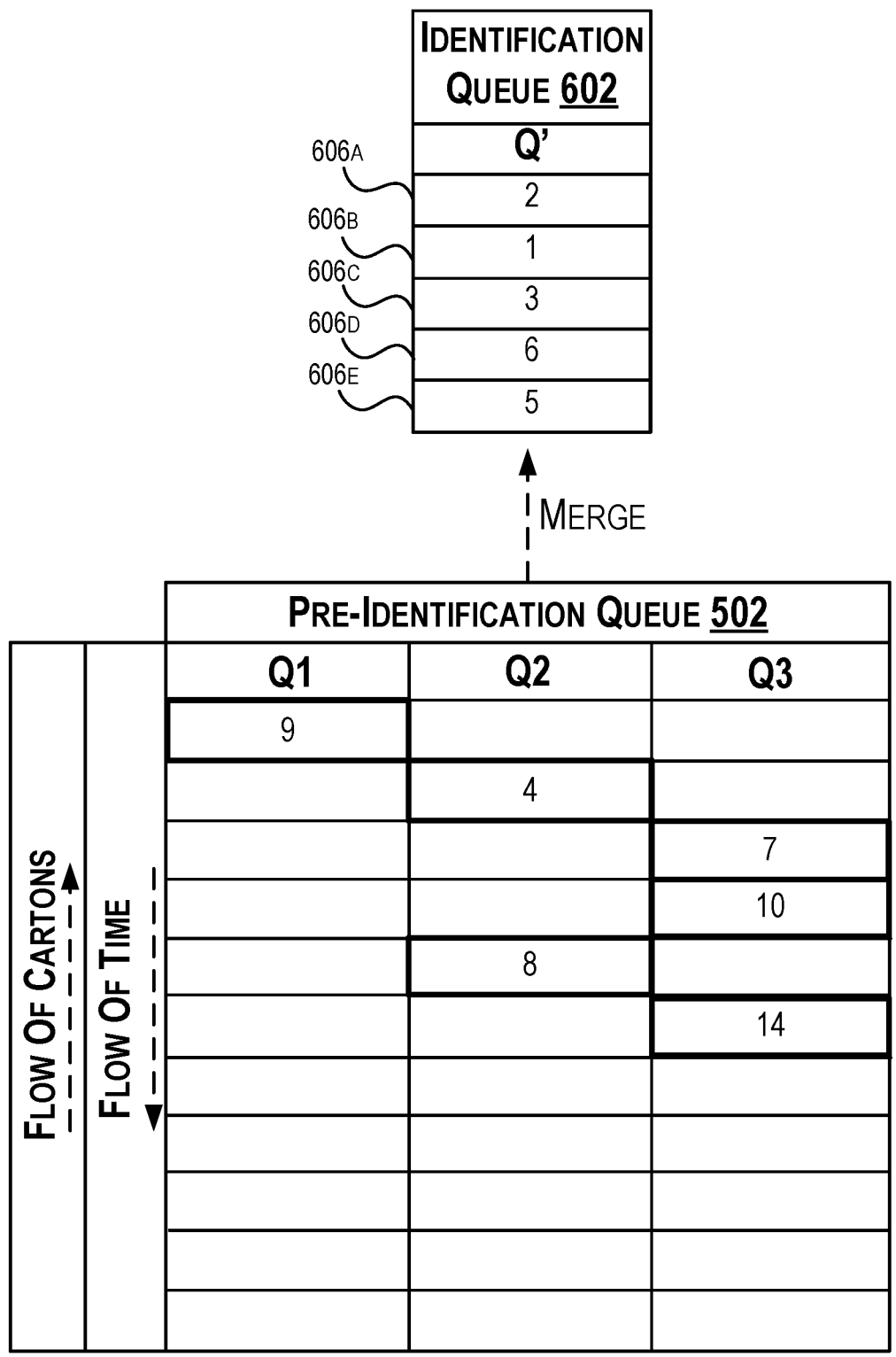
FIG. 6 illustrates an example table of an identification queue of items received by the identification station and an example table of a pre-identification queue, according to some embodiments.
Figure 7:
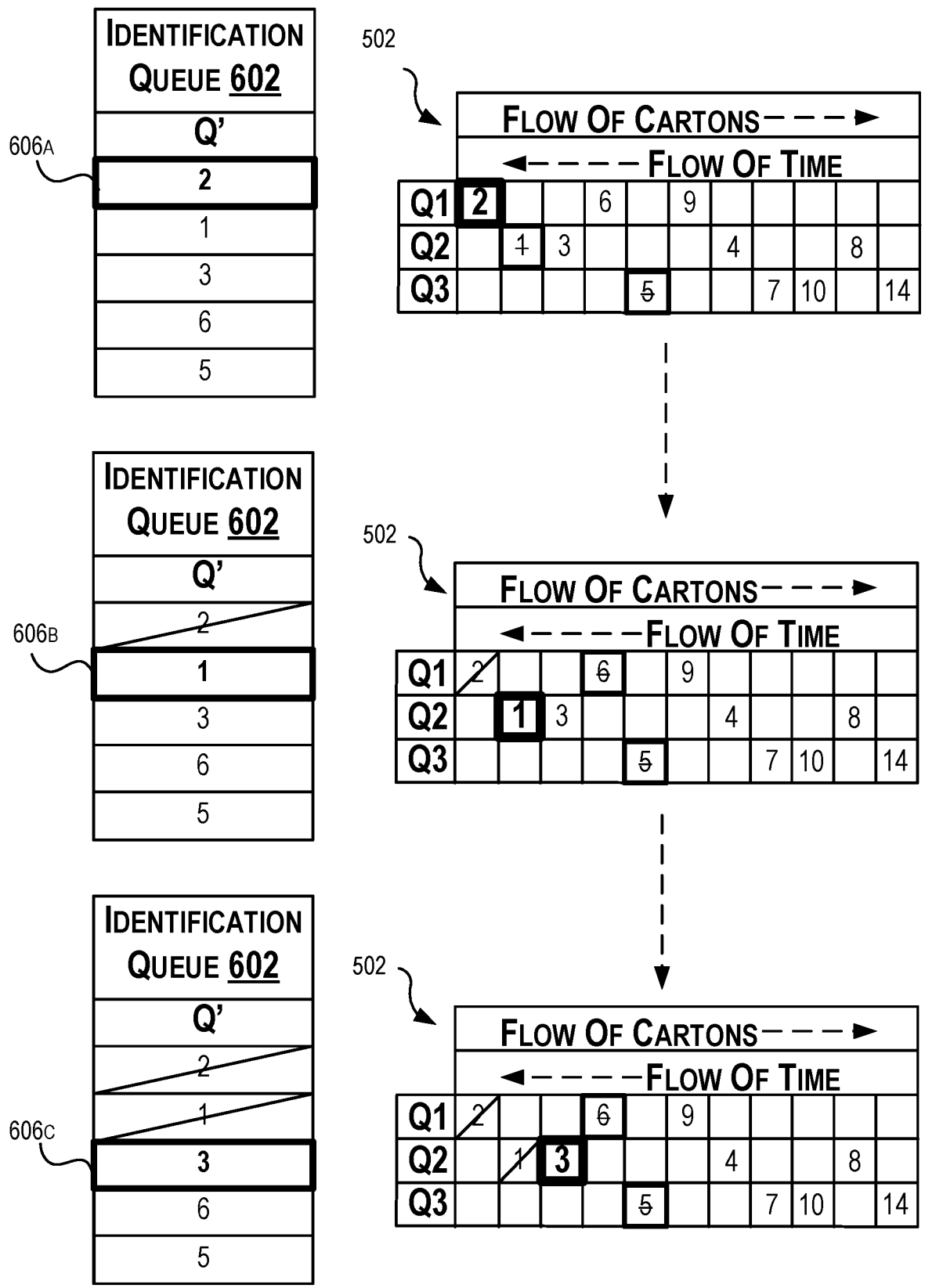
FIG. 7 illustrates matches between an example table of an identification queue and an example table of a pre-identification queue, according to some embodiments.

The items merged on the conveyer system can be conveyed to an identification station. In some examples, the identification station can comprise a tunnel in which the items are received. FIG. 6 illustrates an example table of an identification queue 602 of items 606a-e received by the identification station, also referred to as Q'. FIG. 6 additionally depicts the pre-identification queue 502, which is updated to remove the items 606a-e that are now in the identification station. The first-in first-out order of items from the pre-identification queue 502 is maintained with respect to itself in the identification queue 602, meaning that each of Q1, Q2, and Q3 have their order maintained in Q' as well. For each item 606 in the identification queue 602, a high confidence match is to be made from the pre-identification queue 502. This is depicted in FIG. 7, which illustrates matches between items in the identification queue 602 and the pre-identification queue 502.

For each item 606 that is queued into Q', the search space for a matching algorithm can be confined within the first elements of Q1, Q2, Q3, . . . . QN. Such "first elements" may be a single item from each unloading station, or a set number of items (e.g., five items). For example, item 2 is the first item 606a in the identification queue 602 (although its identity as item 2 is currently unknown). The matching algorithm can form a search space of image embeddings from pre-identification queue 502 to compare with an image embedding of the first item 606a in Q'. The search space can include item 2 (the first image embedding from Q1), item 1 (the first image embedding from Q2), and item 5 (the first image embedding from Q3). The matching algorithm can compare the image embedding of the first item 606a with the image embeddings for items 2, 1, and 5. Of the three items in the search space, item 2 has the highest cosine similarity with the first item 606a. Thus, the matching algorithm selects item 2 as the match, and determines that Q1 is therefore the origin of the first item 606a in Q'.

Because item 2 was selected as being a match, item 2 is removed from the pre-identification queue 502. The search space for the next image embedding in Q' (e.g., second item 606b) is therefore updated to item 6 (the next image embedding from Q1 since item 2 was removed), item 1 from Q2, and item 5 from Q3. Thus, matches for successive items are affected by previously made matches. The matching algorithm can determine that the best match from the updated search space for the second item 606b in Q' is item 1, with an origin of Q2. Item 1 can therefore be removed from the pre-identification queue 502, and the search space for the third item 606c in Q' can be constrained to item 6 from Q1, item 3 from Q2, and item 5 from Q3. The matching algorithm can continue to proceed with matches until the identification queue 602 and the pre-identification queue 502 are empty.

Figure 8:
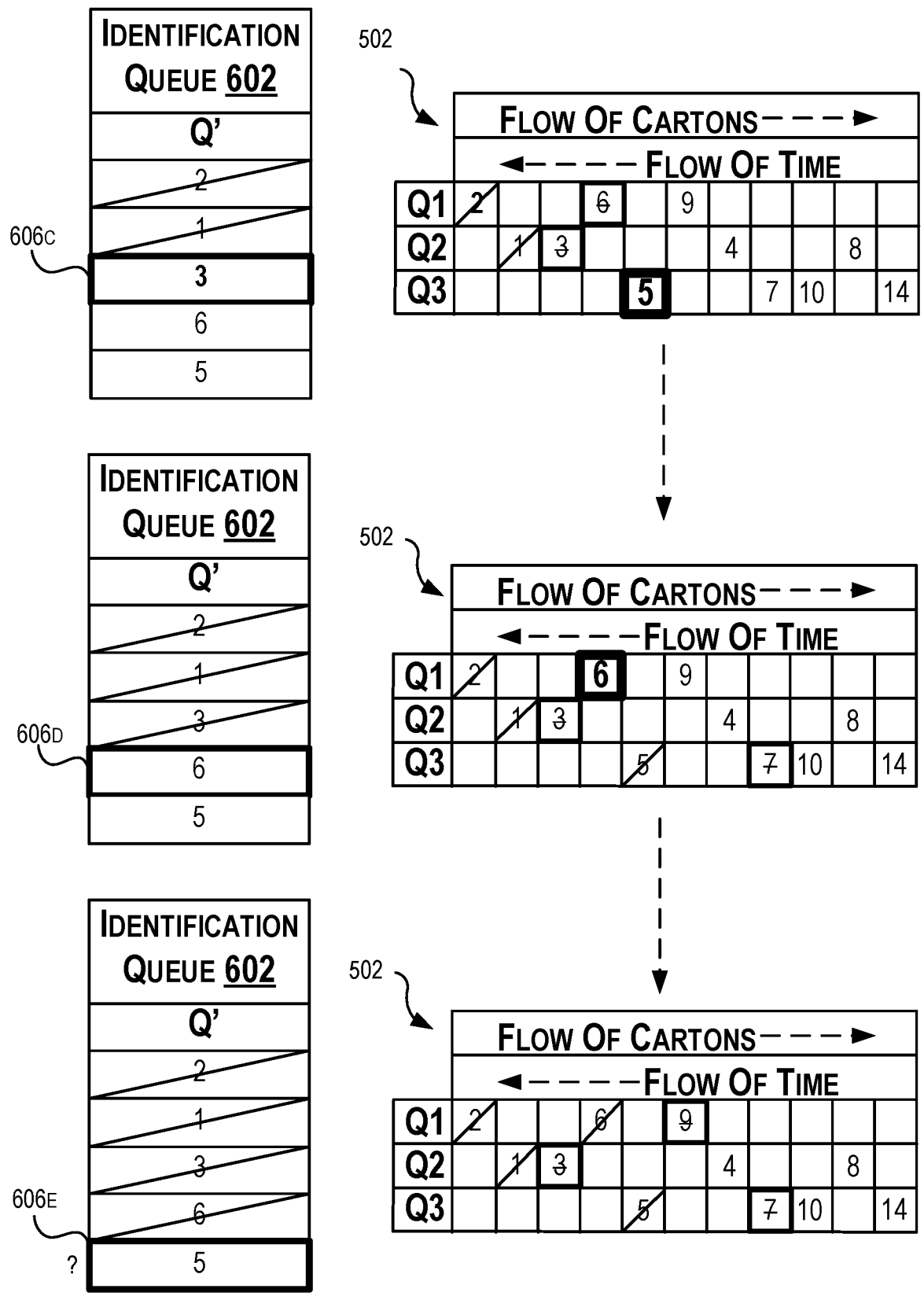
FIG. 8 illustrates a backtracking process for an example table of an identification queue and an example table of a pre-identification queue, according to some embodiments.

As the matching algorithm is unlikely to be correct 100% of the time due to factors such as faulty images, model failure, image pre-processing errors, etc., it may be beneficial to periodically perform a backchecking process for recently made matches. This can reduce cascading effects of incorrectly matched item origins. Such a backtracking process is depicted in FIG. 8. For example, suppose the matching algorithm determines that item 3 from Q2 and item 5 from Q3 each have high cosine similarity values with the third item 606c from Q'. The matching algorithm selects item 5 from Q3 as matching the third item 606c based on having the highest cosine similarity value. This is incorrect.

The matching algorithm will proceed with matching the next match in the queue for the fourth item 606d in Q'. The updated search space includes item 6 from Q1, item 3 from Q2, and item 7 from Q3. Thus far, the incorrect match made for third item 606c is not preventing a correct match. So, the matching algorithm can correctly assign item 6 from Q1 to fourth item 606d. But in the next match for fifth item 606e, the search space is constrained to item 9 from Q1, item 3 from Q2, and item 7 from Q3. None of these items can produce a correct match, and thus each cosine similarity value produced by the matching algorithm for fifth item 606e will be relatively low (e.g., below a predetermined threshold value). Because none of the cosine similarities exceed the predetermined threshold, the backtracking process may be performed to determine if changing a previous match will produce better overall results.

The backtracking process may involve fixed backtracking or adaptive backtracking. For fixed backtracking, a set number of previous matches may be "backtracked." For example, the matching algorithm may re-match the previous three matches. So, the matching algorithm may go back to the third item 606c in the Q' to select the item in the search space with the second highest cosine similarity value. This second-best match can be item 3 from Q2, which is the correct match for third item 606c. The subsequent matches can then proceed with updated search spaces based on the second-best match made for item 3. For example, the search space for fourth item 606d can be constrained to item 6 from Q1, item 3 from Q2, and item 5 from Q3. The match for fourth item 606d may be maintained with item 6 from Q1.

But now, the search space for fifth item 606e is constrained to item 9 from Q1, item 3 from Q2, and the correct match of item 5 from Q3. The matching algorithm can therefore produce a sufficiently high cosine similarity value between fifth item 606e and item 5 from Q3 in this backtracking process.

To confirm that the three backtracked matches are more accurate than the original three matches, the matching algorithm can compare an average of highest cosine similarity values for the original matches to the backtracked matches. If the average is higher for the backtracked matches, the origins for items in Q' can be updated according to the backtracked matches. This can be performed even after labels have been applied to items. Performing periodic backtracking can significantly increase accuracy of item origin identification. If the backtracking process did not produce higher average cosine similarity values even after backtracking, then backtracking may be performed for a higher number of matches (e.g., the most recent five matches). Or, if a particular item in Q' has multiple potential matches with high cosine similarity values (e.g., above a predetermined threshold), then another backtracking process may be performed starting with that item for the match with the third, fourth, etc. highest cosine similarity value.

Backtracking may be performed regularly, such as after a set number of matches can be performed. Additionally or alternatively, backtracking can be performed when low cosine similarity values (e.g., below a predetermined threshold) are generated by the matching algorithm. Or, backtracking can be performed after each match is performed.

In fixed backtracking, a set number of matches are backtracked. By contrast, in adaptive backtracking, for a given item at the head of a backtrack queue, which originates from a certain unloading station, the length of the backtrack queue can be long enough to contain at least a set number of items from that same unloading station. The length of the backtrack queue can therefore adapt according to this requirement. Generally, fixed backtracking involves backtracking less matches than adaptive backtracking. Fixed backtracking can have an advantage over adaptive backtracking because, within the limited number of fixed backtracked matches, it may be less likely for more than one false positive to exist. The probability of false positives may increase for larger adaptive backtracking queues. But, adaptive backtracking can have an advantage over fixed backtracking because adaptive backtracking can allow for multiple (e.g., three to five items) to be present in the backtrack queue. This can cover an edge case where assigning a true positive item at a head of the backtrack queue with a lower cosine similarity value is able to effectively alter the matches for remaining items in the backtrack queue.

In some examples, the backtracking process can be performed for each potential match, not just the match with the second highest cosine similarity value. For example, instead of solely comparing the third item 606c in Q' the second-best match (e.g., item 3), backtracking can also be performed for the third item 606c with each other potential match in the search space.

Backtracking can also be performed for each successive item that gets matched as part of performing backtracking based on the third item 606c. In an example, backtracking can involve matching third item 606c to item 6, which constrains the search space for fourth item 606d to item 9, item 3, and item 5. Backtracked matches can also be made for each of the items in the newly constrained search space for fourth item 606d. Each of the backtracked matches for fourth item 606d based on matching third item 606c to item 6 similarly constrains subsequent search spaces for fifth item 606e, which can also be backtracked. These successive backtracking processes can all be based on the match between third item 606c and item 6, and can be repeated for another match between third item 606c and item 3. Thus, cosine similarity values can be calculated for every combination of matches to identify the most accurate match.[0054]

Figure 9:
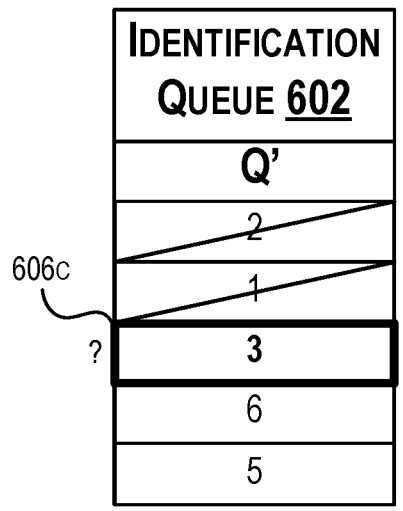
FIG. 9 illustrates a holding process for an example table of an identification queue and an example table of a pre-identification queue, according to some embodiments.
Figure 9:
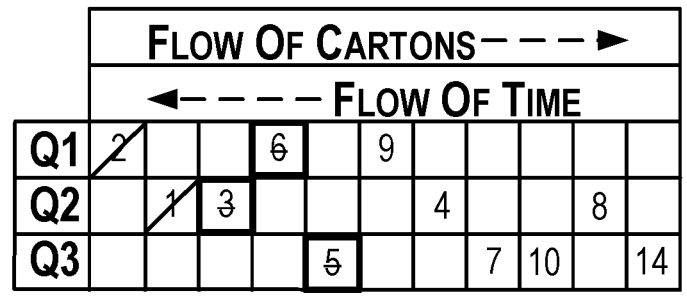
Figure 9:
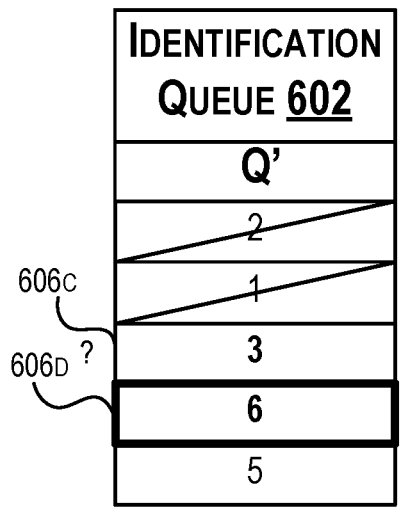
Figure 9:
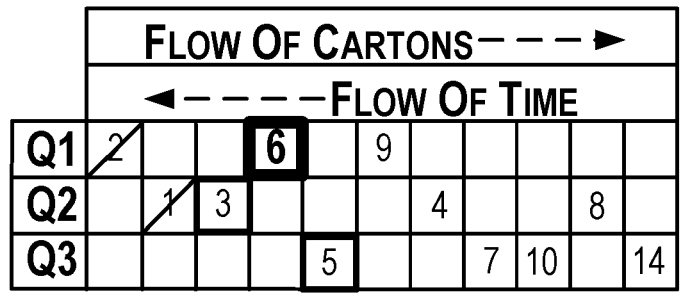
Figure 9:
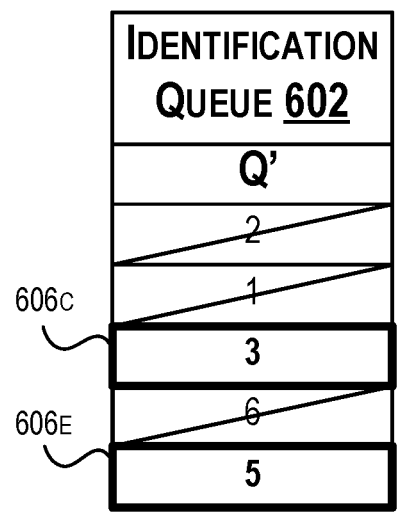
Figure 9:
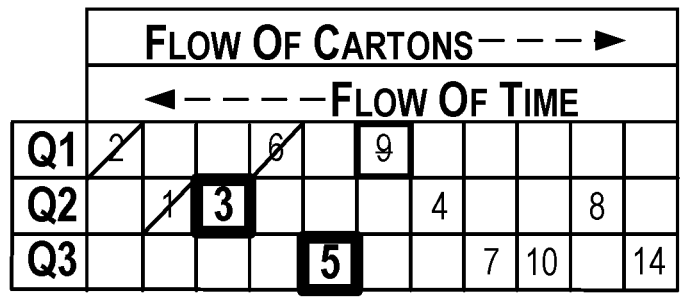

FIG. 9 illustrates tables of pre-identification queues 502 and identification queues 602 for an edge case with low cosine similarity values. For example, the matching algorithm may determine cosine similarity values between the third item 606c in Q' and items in the search space. The search space can include item 6 from Q1, item 3 from Q2, and item 5 from Q3. None of the items in the search space may have a high enough cosine similarity value (e.g., above a threshold amount). Rather than performing a backtracking process, the match for third item 606c may instead be "held" in Q' for a set number of additional iterations of the matching algorithm.

For example, the third item 606c may be held for two additional iterations. The matching algorithm may proceed with identifying a match for the next item in the queue, which is fourth item 606d. Third item 606c is held in Q', and the search space is still constrained to include item 6 from Q1, item 3 from Q2, and item 5 from Q3. The matching algorithm may determine a match between fourth item 606d and item 6 from Q1. But third item 606c may still not have a match from the search space with cosine similarity values above the predetermined threshold. Thus, third item 606c is held for the next iteration as the matching algorithm proceeds with identifying a match for the next item in the queue, which is fifth item 606e. The search space is now constrained to item 9 from Q1, item 3 from Q2, and item 5 from Q3. The matching algorithm may determine a match between fifth item 606e and item 5 from Q3. Because the third item 606c has been held for the set number of two iterations, the item in the search space with the highest similarity value may then be selected as a match for third item 606c. That is, item 3 from Q2 can be selected as a match for third item 606c. In some examples, a backtracking process may additionally be performed for matches preceding third item 606c.

FIG. 10 illustrates a flowchart showing an example process 1000 for identifying item origin by matching image embeddings, according to some embodiments. In some examples, the computing system 114 or the computer system 1202 of FIG. 12 may perform some or all parts of the process 1000.

The process 1000 begins at block 1002 by accessing first image data corresponding to a set of items at a first location of a facility. The first image data can be associated with the first location and can be obtained by a first imaging device. In some examples, the set of items can be a first set of items unloaded at the first location onto a first conveyer system that delivers items to a main conveyer system. The first image data can correspond to a first set of images obtained by the first imaging device at the first conveyer system. Each of the first set of items may be a same type of container, material, or dimension.

At block 1004, a first set of image embeddings can be generated based on the first image data. The first set of image embeddings can represent the first set of items. In some examples, third image data may also be obtained that corresponds to a second set of images of a second set of items unloaded at a second location of the facility onto a second conveyer system that delivers items to the main conveyer system. The second set of images can be obtained by a third imaging device at the second conveyer system. A second set of image embeddings can be generated based on the third image data. The second set of image embeddings can represent the second set of items.

At block 1006, a first item of the set of items can be determined to have originated at the first location based at least in part on a matching algorithm comparing the first set of image embeddings with a second image embedding that represents the first item at an identification location of the facility. This second image embedding can be generated by first accessing second image data corresponding to the first item. The second image data can be obtained by a second imaging device at the identification location of the facility. The second image embedding can be generated based on the second image data such that the second image embedding represents the first item. In some examples, an origin of a second item can be determined based at least in part on determining that the first item originated from the first location. The second item can be positioned upstream on the conveyer system from the first item.

The matching algorithm may determine a cosine similarity value between the second image embedding of the first item and each of the first set of image embeddings. An image embedding of the first set of image embeddings can be selected that has a highest cosine similarity value with the second image embedding. The selected image embedding can be linked to a location identifier for the first location from which the first item originated.

In some examples, the first item can be determined to have originated at the first location based at least in part on the matching algorithm comparing the second set of image embeddings with the second image embedding (in addition to comparing with the first set of image embeddings).

In some examples, the first set of items can be unloaded from a first pallet onto the first location of a main conveyer system. The first image data can correspond to a first set of images of the first set of items obtained by a first imaging device positioned on the main conveyer system downstream from the first location. The first set of images can be linked to a pallet identifier for the first pallet. Additionally, the third image data can correspond to a second set of images of a second set of items unloaded from a second pallet onto a second location of the main conveyer system. The second location and the third imaging device that obtained the second set of images can be downstream from the first imaging device and the first location. The second set of images can be linked to a second pallet identifier for the second pallet. The second set of images captured by the third imaging device can additionally include images of the first set of items. The first item can be determined as being unloaded from the first pallet based at least in part on determining that the second image embedding matches an image from the first set of image embeddings and an image embedding from the second set of image embeddings.

Further, a second item can be determined as being unloaded from the second pallet based at least in part on determining that a third image embedding representing the second item (i) matches an image embedding from the second set of image embeddings and (ii) does not match any image embeddings from the first set of image embeddings. Then, the second item can be determined as originating from the second location based at least in part on the second pallet identifier linked to the second location.

In some examples, a backtracking process may be performed after determining that the first item originated from the first location. For example, a highest cosine similarity value between a third image embedding of a second item and the first set of image embeddings can be determined to be below a threshold amount. The matching algorithm can therefore reselect another image embedding of the first set of image embeddings for the first item. Based on the reselected image embedding, the matching algorithm can updated cosine similarity values for the third image embedding of the second item. A highest updated cosine similarity value for the third image embedding of the second item can be determined as exceeding the threshold amount.

Thus, an origin of the first item can be reassigned based at least in part on the reselected image embedding.

In some examples, the matching algorithm can compare a search space of image embeddings comprising a portion of the first set of image embeddings with the second image embedding. The portion of the first set of image embeddings can include image embeddings of a threshold number of initial items unloaded at the first location. The matching algorithm can match the second image embedding to an image embedding of the search space to determine that the first item originated from the first location. The search space can then be updated to remove the matched image embedding and to include a next image from the first set of image embeddings. The origin for a second item succeeding the first item can be based at least in part on the matching algorithm using the updated search space.

A backtracking process can be performed for multiple items for which origins have been determined. This can involve assigning an updated origin of a second location to the first item. The backtracked items can have a first average match value produced by the matching algorithm prior to assigning the updated origin. The search space can be updated for each of the backtracked items based on the updated origin. A second average match value produced by the updated search space can be determined to be higher than the first average match value. The first item can then be determined as originating from the second location based at least in part on determining that the second average match value is higher than the first average match value.

In some examples, the backtracking process can be performed from the first item to a threshold number of items succeeding the first item. In other examples, the search space can additionally include a portion of a second set of image embeddings of a second set of items captured at the second location of the facility. The items for which the backtracking process is performed includes at least a threshold number of items from the second set of image embeddings.

FIG. 11 illustrates a flowchart showing an example process 1100 for identifying item origin by matching image embeddings, according to some embodiments. In some examples, the computing system 114 or the computer system 1202 of FIG. 12 may perform some or all parts of the process 1100.

The process 1100 begins at block 1102 by applying an embedding process to (i) a first set of images to generate an first set of image embeddings, (ii) a second set of images to generate a second set of image embeddings, and (iii) a first image to generate a first image embedding. The first set of images can be captured by a first camera. The first set of images depicts a first set of cartons when the first set of cartons is unloaded onto a conveyer system at a first unloading station. The first unloading station can be associated with a first location identifier. Each image of the first set of images can be linked to the first location identifier. The second set of images can be captured by a second camera. The second set of images can depict a second set of cartons when the second set of cartons is unloaded onto the conveyer system at a second unloading station. The second unloading station can be associated with a second location identifier. Each image of the second set of images can be linked to the second location identifier. The first image of the first carton can be captured by a third camera at an identification of the conveyer system. The first set of cartons and the second set of cartons can include cartons of a same type, a same dimension, or a same material.

At block 1104, the first image embedding can be compared to the first set of image embeddings and the second set of image embeddings using a matching algorithm. In some examples, this can involve identifying a first subset of the first set of image embeddings. The first subset can include a threshold number of image embeddings of cartons initially unloaded at the first unloading station. A second subset of the second set of image embeddings can also be identified. The second subset can include the threshold number of image embeddings of cartons initially unloaded at the second unloading station. Then, a search space of comparison for the first image embedding can be constrained to the first subset and the second subset.

At block 1106, a match between the first image embedding and another image embedding of the first set of image embeddings can be determined based on output from the matching algorithm. For example, the matching algorithm can determine cosine similarity between the first image embedding and each image embedding of the first subset and the second subset. The match can be determined by selecting an image embedding from the first subset or the second subset that has a highest cosine similarity value with the first image embedding. At block 1108, a label can be automatically applied to the first carton responsive to determining the match between the first image embedding and the other image embedding of the first set of image embeddings. The label can comprise or be associated with the first location identifier.

Figure 12:
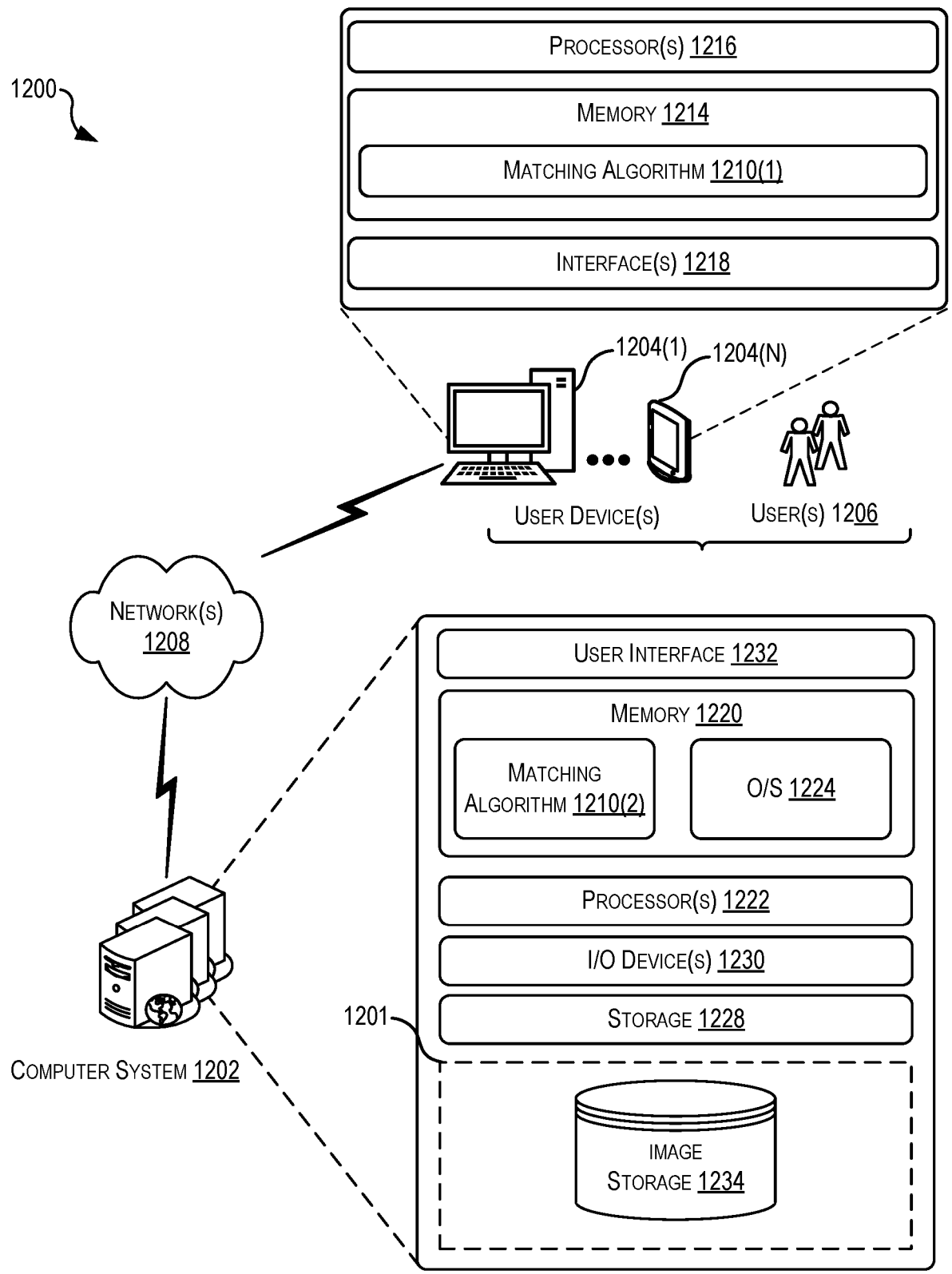
FIG. 12 illustrates an environment in which various embodiments can be implemented.

FIG. 12 illustrates an example schematic architecture 1200 for implementing techniques related to item origin identification by matching image embeddings, according to embodiments of the present disclosure. The architecture 1200 may include a computer system 1202 (e.g., the computing system 114 described herein) in communication with one or more user devices 1204(1)-1204(N) via one or more networks 1208 (hereinafter, "the network 1208").

The user device 1204 may be operable by one or more users 1206 to interact with the computer system 1202. The user device 1204 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 1204(1) is illustrated as a desktop computer, while the user device 1204(N) is illustrated as an example of a handheld mobile device.

The user device 1204 may include a memory 1214 and processor(s) 1216. In the memory 1214 may be stored program instructions that are loadable and executable on the processor(s) 1216, as well as data generated during the execution of these programs. Depending on the configuration and type of user device 1204, the memory 1214 may be volatile (such as random access memory ("RAM")) and/or non-volatile (such as read-only memory (ROM), flash memory, etc.).

In some examples, the memory 1214 may include a version of a matching algorithm 1210 (e.g., 1210(1)). The matching algorithm 1210(1) may allow the user 1206 to interact with the computer system 1202 via the network 1208. The user device 1204 may also include one or more interfaces 1218 to enable communication with other devices, systems, and the like. The matching algorithm 1210(1), whether embodied in the user device 1204 or the computer system 1202, may be configured to perform the techniques described herein. In an example, the matching algorithm 1210 can include any other suitable devices, engines, modules, models, and the like.

Turning now to the details of the computer system 1202, the computer system 1202 may include one or more computer system computers, perhaps arranged in a cluster of servers or as a server farm, and may host web service applications. The function of the computer system 1202 may be implemented a cloud-based environment such that individual components of the computer system 1202 are virtual resources in a distributed environment.

The computer system 1202 may include at least one memory 1220 and one or more processing units (or processor(s)) 1222. The processor 1222 may be implemented as appropriate in hardware, computer-executable instructions, software, firmware, or combinations thereof. Computer-executable instruction, software, or firmware implementations of the processor 1222 may include computer-executable or machine-executable instructions written in any suitable programming language to perform the various functions described. The memory 1220 may include more than one memory and may be distributed throughout the computer system 1202. The memory 1220 may store program instructions that are loadable and executable on the processor(s) 1222, as well as data generated during the execution of these programs. Depending on the configuration and type of memory including the computer system 1202, the memory 1220 may be volatile (such as RAM and/or non-volatile (such as read-only memory ("ROM"), flash memory, or other memory)). The memory 1220 may include an operating system 1224 and one or more application programs, modules, or services for implementing the features disclosed herein including at least a version of the matching algorithm 1210 (e.g., 1210(2)). For example, the matching algorithm 1210(2) may perform the functionality described herein.

The computer system 1202 may also include additional storage 1228, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1228, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1202 and/or part of the computing system 114.

The computer system 1202 may also include input/output (I/O) device(s) and/or ports 1230, such as for enabling connection with a keyboard, a mouse, a pen, a voice input device, a touch input device, a display, speakers, a printer, or other I/O device.

In some examples, the computer system 1202 may also include one or more user interface(s) 1232. The user interface 1232 may be utilized by an operator, curator, or other authorized user to access portions of the computer system 1202. In some examples, the user interface 1232 may include a graphical user interface, voice interfaces, web-based applications, programmatic interfaces such as APIs, or other user interface configurations.

The computer system 1202 may also include a data store 1201. In some examples, the data store 1201 may include one or more databases, data structures, or the like for storing and/or retaining information associated with the computer system 1202. The matching algorithm 1210 is communicatively coupled (e.g., via a wired connection or a wireless connection) to the data store 1201. The data store 1201 includes an image storage 1234. In an example, the data store 1201 can include any other suitable data, databases, libraries, and the like. The image storage 1234 can include images of items (e.g., cartons) and image embeddings of the images.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a first camera configured to capture a first set of images of a first set of cartons when the first set of cartons is unloaded onto a conveyer system at a first unloading station, the first unloading station associated with a first location identifier, each image of the first set of images being linked to the first location identifier;
    a second camera configured to capture a second set of images of a second set of cartons when the second set of cartons is unloaded onto the conveyer system at a second unloading station, the second unloading station associated with a second location identifier, each image of the second set of images being linked to the second location identifier;
    a third camera configured to capture a first image of a first carton at an identification station of the conveyer system; and
    a computer system communicatively coupled to the first camera, the second camera, and the third camera and configured to at least:
        apply an embedding process to (i) the first set of images to generate an first set of image embeddings, (ii) the second set of images to generate a second set of image embeddings, and (iii) the first image to generate a first image embedding;
        compare, using a matching algorithm, the first image embedding to the first set of image embeddings and the second set of image embeddings;
        determine, based on output from the matching algorithm, a match between the first image embedding and another image embedding of the first set of image embeddings; and
        automatically apply a label comprising the first location identifier to the first carton responsive to determining the match between the first image embedding and the other image embedding of the first set of image embeddings.

2. The system of claim 1, wherein the computer system is further configured to compare, using the matching algorithm, the first image embedding to the first set of image embeddings and the second set of image embeddings by:

identifying a first subset of the first set of image embeddings, the first subset comprising a threshold number of image embeddings of cartons initially unloaded at the first unloading station;

identifying a second subset of the second set of image embeddings, the second subset comprising the threshold number of image embeddings of cartons initially unloaded at the second unloading station; and constraining a search space of comparison for the first image embedding by the matching algorithm to the first subset and the second subset.

3. The system of claim 2, wherein the computer system is further configured to:

determine, by the matching algorithm, cosine similarity between the first image embedding and each image embedding of the first subset and the second subset; and determine the match by selecting an image embedding from the first subset or the second subset that has a highest cosine similarity with the first image embedding.

4. The system of claim 1, wherein the first set of cartons and the second set of cartons comprise cartons of a same type, a same dimension, or a same material.

5. A computer-implemented method comprising:

accessing first image data corresponding to a set of items at a first location of a facility, the first image data associated with the first location and obtained by a first imaging device;

generating a first set of image embeddings based on the first image data, the first set of image embeddings representing the set of items; and determining that a first item of the set of items originated at the first location based at least in part on a matching algorithm comparing the first set of image embeddings with a second image embedding that represents the first item at an identification location of the facility.

6. The computer-implemented method of claim 5, further comprising:

accessing second image data corresponding to the first item, the second image data obtained by a second imaging device at the identification location of the facility; and generating the second image embedding based on the second image data, the second image embedding representing the first item.

7. The computer-implemented method of claim 5, wherein the set of items is a first set of items unloaded at the first location onto a first conveyer system delivering items to a main conveyer system, wherein the first image data corresponds to a first set of images obtained by the first imaging device at the first conveyer system, and wherein the computer-implemented method further comprises:

accessing third image data corresponding to a second set of images of a second set of items unloaded at a second location of the facility onto a second conveyer system delivering items to the main conveyer system, the second set of images obtained by a third imaging device at the second conveyer system;

generating a second set of image embeddings based on the third image data, the second set of image embeddings representing the second set of items; and determining that the first item originated at the first location based at least in part on the matching algorithm comparing the second set of image embeddings with the second image embedding.

8. The computer-implemented method of claim 5, wherein the set of items is a first set of items unloaded from a first pallet onto the first location of a main conveyer system, wherein the first image data corresponds to a first set of images of the first set of items obtained by a first imaging device positioned on the main conveyer system downstream from the first location, wherein the first set of images are linked to a first pallet identifier for the first pallet, and wherein the computer-implemented method further comprises:

accessing third image data corresponding to a second set of images of a second set of items unloaded from a second pallet onto a second location of the main conveyer system, the second location and a third imaging device that obtained the second set of images being downstream from the first imaging device and the first location, the second set of images linked to a second pallet identifier for the second pallet, the second set of images further comprising images of the first set of items;

generating a second set of image embeddings based on the third image data, the second set of image embeddings representing the second set of items; and determining that the first item was unloaded from the first pallet based at least in part on determining that the second image embedding matches an image from the first set of image embeddings and an image embedding from the second set of image embeddings.

9. The computer-implemented method of claim 8, further comprising:

determining that a second item was unloaded from the second pallet based at least in part on determining that a third image embedding representing the second item (i) matches an image embedding from the second set of image embeddings and (ii) does not match any image embeddings from the first set of image embeddings; and determining that the second item originated from the second location based at least in part on the second pallet identifier linked to the second location.

10. The computer-implemented method of claim 5, further comprising:

determining an origin of a second item based at least in part on determining that the first item originated from the first location, the second item positioned upstream on a conveyer system from the first item.

11. The computer-implemented method of claim 5, further comprising:

determining, via the matching algorithm, a cosine similarity value between the second image embedding of the first item and each of the first set of image embeddings; and selecting an image embedding of the first set of image embeddings that has a highest cosine similarity value with the second image embedding, the selected image embedding being linked to a location identifier for the first location from which the first item originated.

12. The computer-implemented method of claim 11, further comprising, subsequent to determining that the first item originated from the first location:

determining that a highest cosine similarity value between a third image embedding of a second item and the first set of image embeddings is below a threshold amount; and reselecting another image embedding of the first set of image embeddings for the first item responsive to determining that the highest cosine similarity value for the third image embedding of the second item is below the threshold amount.

13. The computer-implemented method of claim 12, further comprising:
   determining updated cosine similarity values for the third image embedding of the second item based at least in part on the reselected image embedding;
   determining that a highest updated cosine similarity value for the third image embedding of the second item exceeds the threshold amount; and
   reassigning an origin of the first item based at least in part on the reselected image embedding.

14. The computer-implemented method of claim 5, wherein each of the first set of items is a same type of container.

15. One or more non-transitory computer-readable media comprising computer-executable instructions that, when executed by one or more processors of a computing device, cause the computing device to perform operations comprising:
   accessing first image data corresponding to a set of items at a first location of a facility, the first image data associated with the first location and obtained by a first imaging device;
   generating a first set of image embeddings based on the first image data, the first image embeddings representing the set of items; and
   determining that a first item of the set of items originated from the first location based at least in part on a matching algorithm comparing a search space of image embeddings comprising a portion of the first set of image embeddings with a second image embedding that represents the first item at an identification location of the facility.

16. The one or more non-transitory computer-readable media of claim 15, wherein the portion of the first set of image embeddings comprises image embeddings of a threshold number of initial items unloaded at the first location, and wherein the operations further comprise:
   matching, via the matching algorithm, the second image embedding to an image embedding of the search space to determine that the first item originated from the first location;
   updating the search space to remove the matched image embedding and to include a next image from the first set of image embeddings; and
   determining an origin for a second item succeeding the first item based at least in part on the matching algorithm using the updated search space.

17. The one or more non-transitory computer-readable media of claim 15, wherein the operations further comprise performing a backtracking process on a plurality of items for which origins have been determined, the backtracking process comprising:
   assigning an updated origin of a second location to the first item, the plurality of items having a first average match value produced by the matching algorithm prior to assigning the updated origin;
   updating the search space for each item in the plurality of items based on the updated origin;
   determining that a second average match value produced by the matching algorithm using the updated search space is higher than the first average match value; and
   determining that the first item originated from the second location based at least in part on determining that the second average match value is higher than the first average match value.

18. The one or more non-transitory computer-readable media of claim 17, wherein the operations further comprise:
   performing the backtracking process from the first item to a threshold number of items succeeding the first item.

19. The one or more non-transitory computer-readable media of claim 17, wherein the search space additionally comprises a portion of a second set of image embeddings of a second set of items captured at the second location of the facility, and wherein the plurality of items for which the backtracking process is performed includes at least a threshold number of items from the second set of image embeddings.

20. The one or more non-transitory computer-readable media of claim 15, wherein each of the first set of items comprise a same material or dimension.

* * * * *